Sept. 4, 1956
E. DONAT
2,761,982
ELECTRICAL IMPULSE TRANSMITTER WITH
MAGNETO-ELECTRICAL SELF-CONTROL
Filed Sept. 20, 1952
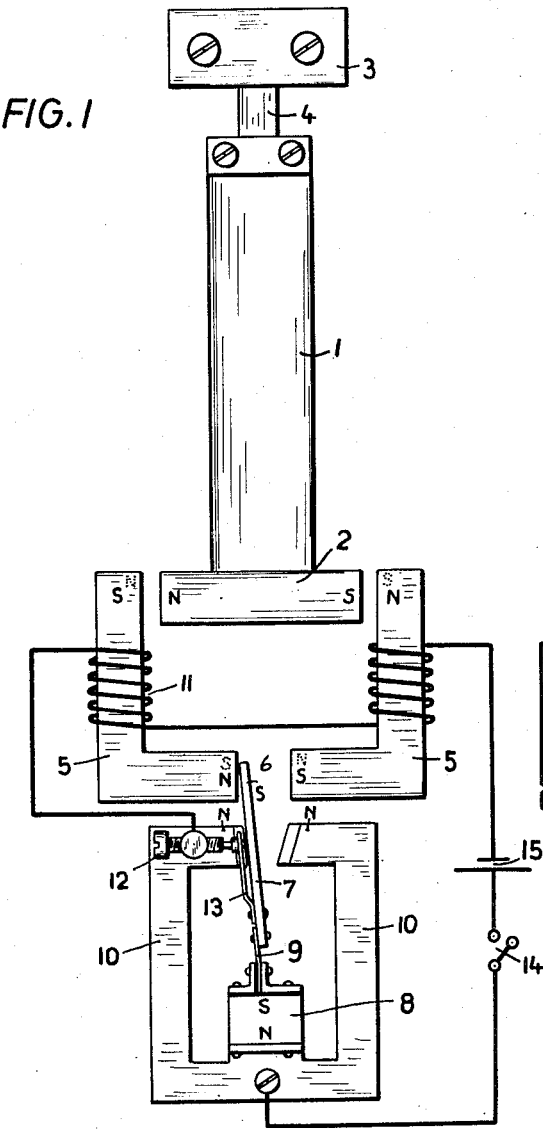
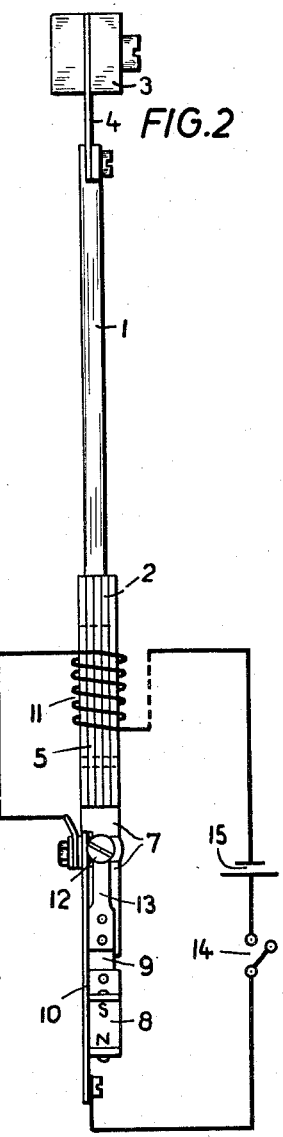
Inventor:
Ernst Donat
By:
Michael S. Striker
agt.

United States Patent Office 2,761,982
Patented Sept. 4, 1956

2,761,982

ELECTRICAL IMPULSE TRANSMITTER WITH MAGNETO-ELECTRICAL SELF-CONTROL

Ernst Donat, Frankfurt am Main, Germany

Application September 20, 1952, Serial No. 310,653

Claims priority, application Germany September 25, 1951

10 Claims. (Cl. 310—32)

This invention relates to an electrical impulse transmitter with magneto-electrical self-control which is particularly suitable for time measurements and is distinguished by its accuracy and low current consumption.

Electrical impulse transmitters for time measurement are known. They serve in particular for the determination of the time history of variable operations which are recorded by recording apparatus such as oscillographs, tachographs, and the like. However, arrangements are also known in clock construction in which time can be measured by means of electrical impulse transmitters or oscillatable structures through indicating or recording apparatus. In such apparatus use is made of the natural oscillation of bars, strings, crystals or the like, clamped at their ends, in order to count the number of oscillations directly or indirectly through contacts, photoelectric cells, oscillatory circuits, or the like, or to utilise the same in some other manner for the measurement of time. Secondary clock installations are, for example, known instruments for the measurement of time working on this principle. In such installations, the oscillations of a pendulum are converted through a contact into direct current impulses, if desired with periodic reversal of polarity, and counted in the secondary clocks by electromagnetic step switch mechanisms, which in turn drive pointers moving in front of a clock dial.

In all these arrangements it is an aim to withdraw from or supply to the oscillating structure as little energy as possible, but above all as far as possible exactly the same amount of energy for each oscillation. In electromagnetically excited pendulums, the direct operation of the control contacts by the oscillating pendulum is therefore generally avoided, particularly in cases in which the instruments are intended for continuous operation and great accuracy in running is required, as for example in the case of clocks.

In addition, an arrangement has been disclosed in which the natural oscillation of a rotary pendulum is electromagnetically impulsed through a contact controlled directly by the pendulum. This arrangement drives an indicator mechanism for the purpose of time measurement, the drive taking place here directly through the rotary pendulum by way of a right-left running gear. This therefore means that not only the entire driving energy for the movement of the indicator mechanism but also the contact work, which over a lengthy period is likewise necessarily inconstant, are taken from the energy of the oscillating pendulum. Even given maximum accuracy of the individual structural elements, it is impossible in practice to achieve constancy over a lengthy period of the damping of the rotary pendulum caused by the withdrawal of energy which is great in relation to its total energy content, and hence of its period of oscillation. Such an arrangement can therefore be used as an impulse time mark transmitter or clock drive only when the lowest standard of accuracy in measurement is demanded, apart from the fact that the structural elements for the transmission of the oscillation of the rotary pendulum to the indicator mechanism in all cases require maximum accuracy in manufacture and consequently are very expensive.

The present invention aims at obviating the foregoing disadvantages and, to this end, consists in an electrical impulse transmitter having an electromagnetically excited self-controlling pendulum, characterised in that the oscillations of a permanent magnet, which is suspended in the field of an electromagnet formed in an air gap, are transmitted by magnetic induction to a polarised armature which oscillates in a second air gap of the same electromagnet and operates contacts by which the circuit of the electromagnet is closed and opened in rhythm with the oscillations of the permanent magnet.

In the arrangement according to the invention, it is possible, on the one hand, to allow the pendulum to swing freely without any mechanical contact, so that all disadvantages and inaccuracies entailed by the latter are eliminated, while on the other hand, through the premagnetisation of the armature acting on the contacts, the forces available for the making of contact are so great that even in continuous operation neither the transition resistance at the contacts nor the moment of time at which the circuit is closed or opened is subject to appreciable fluctuation in relation to the position of the oscillating pendulum. By virtue of these means, therefore, all the difficulties are obviated which fundamentally impaired the accuracy of measurement in known arrangements having self-controlled electromagnetically excited pendulums. In addition, the simple construction ensures economic manufacture and therefore a low cost price.

According to a feature of the invention, the electromagnet consists of two yokes made of laminated metal sheets, which carry the exciter coils and by their ends limit the air gap for the oscillating permanent magnet and the polarised armature. The yokes can have a different shape, for example the shape of an angle.

According to a further feature of the invention, the polarised armature is disposed to oscillate elastically in the air gap between a double pole shoe of a magnetic circuit excited by a permanent magnet, while this, preferably yoke-shaped, double pole shoe assumes a position in relation to the electromagnetically excited circuit or to the appertaining air gap such that the armature in its two end positions bears in each case simultaneously against one pole of the electromagnetically excited yoke and the double pole shoe of its own permanent-magnetically excited yoke. Thus, the contact force is still further increased and a particularly faultless and dependable working arrangement is achieved since the polarised armature simultaneously oscillates in both air gaps and opens or closes the exciter contact.

The pendulum may be constructed to oscillate in a vertical plane like a flat pendulum or it may be constructed as a rotary pendulum. In the latter case, the permanent magnet body is, for example, mounted on points and connected to a spiral spring for the purpose of maintaining the oscillation.

An alternative suspension arrangement may be provided by means of tension bands, while the magnitude of the tension of the bands can at the same time serve to adjust the natural frequency of the rotating pendulum. The rotating pendulum or the pendulum body is advantageously produced by producing around a permanent magnet, by the injection casting method, a casting of aluminium or other injectable non-magnetic metals.

The number of the pendulum oscillations can be counted in manner known per se by an electromagnetic step switch mechanism or the like and indicated for the purpose of measuring time by way of pointers or figure rollers. The arrangement is advantageously so effected according to the invention that the pre-magnetised armature directly drives a step switch mechanism or the like.

In order that the invention may be more readily understood, reference is made to the accompanying drawings, which illustrate diagrammatically and by way of example one embodiment thereof, in which:

Fig. 1 is a front view of the impulse transmitter with the electrical circuit thereto; and Fig. 2 is a side elevation thereof with the double pole shoe removed for clarification.

In said drawings, 1 denotes a pendulum, which is constructed at its free end as a permanent magnet 2 and is elastically suspended in 3 by means of a sheet metal spring strip 4. In its position of rest, an exciting electromagnet 5, the yoke of which has an air gap 6, is located in front of the poles of the permanent magnet pendulum 1, 2. An armature 7, which is premagnetised by a magnet 8 through an elastic mounting 9, projects into this air gap. A double pole shoe 10 fastened to the magnet 8 holds the armature 7 fast by magnetic means in its two end positions. When the pendulum 1 with its free permanent-magnetic end 2 is in the position of rest, its north pole (see polarity designation in solid lines) induces a north pole on the air gap 6 through the leg facing it of the exciting electromagnet 5, while its south pole induces a south pole on the opposite side of the air gap 6. The armature 7 projecting into the resulting field of force and magnetised with a south pole by the magnet 8 is thus repelled by the south pole on the air gap 6 and bears against the opposite north pole, which holds it fast together with the double pole shoe 10, which has a north pole from the magnet 8. The armature thus closes the current path for the coils 11 through an insulated contact screw 12 and a contact spring 13. On closing of a switch 14 a current will then flow from a source of current 15 through the coils 11, the contacts 12—13, the armature 7, its suspension 9, the magnet 8, the pole shoe 10, and the switch 14 back to the source of current. Given correct polarity on the exciting electromagnet 5, this current produces a north pole opposite the north pole of the permanent-magnetic pendulum end 2 (see polarity designation in broken lines), and a south pole opposite its south pole. The pendulum is therefore repulsed and caused to oscillate. At the same time, however, when the poles of the electromagnet 5 are constructed in this manner, a south pole is necessarily produced in its air gap 6 where previously there was a north pole, and the converse occurs on the opposite side. The pre-magnetised armature must therefore move from one side of the air gap 6 over to the other side and thereby opens the circuit by lifting the spring 13 off the contact screw 12. It is held again in this position by the pole shoe 10 which is magnetised with a nroth pole by the magnet 8, until the pendulum 1 has nearly completed a half-oscillation and with its permanent-magnetic end 2 has again approached so closely to the exciting electromagnet 5 that the pole strength induced by it at the air gap 6 is sufficient to allow the armature 7 to drop back into its starting position. The contact 12—13 is thus closed again, the pendulum is again impulsed, and the movement operation of the armature begins again.

The frequency of the armature is therefore accurately determined by the frequency of the pendulum 1. At the same time, however, the spacing of the current impulses produced by the contact 12—13 is also determined by the pendulum frequency. The apparatuses provided for counting, registering, or otherwise utilising these impulses are either controlled by generally known methods through the contact 12—13 or other contact arrangements not separately illustrated and also operated by the armature 7, or are driven direct by the armature 7.

I claim:

1. An electric impulse generator comprising in combination, electromagnetic means having first and second pairs of spaced pole pieces forming first and second air gaps respectively; a pendulum having a permanent magnet end portion located within said first air gap oscillatable between said first pair of pole pieces; means for energizing said electromagnetic means; and a permanent magnet switch member arranged in said second air gap oscillatably between said second pair of pole pieces for connecting said energizing means with said electromagnetic means when attracted by one of said pole pieces and disconnecting said energizing means from said electromagnetic means when attracted by the other of said pole pieces of said second pair of pole pieces.

2. An electric impulse generator comprising in combination, electromagnetic means having first and second pairs of spaced pole pieces forming first and second air gaps respectively, said first air gap being formed at one end of said electromagnetic means, said second air gap being formed at the other end of said electromagnetic means; a pendulum having a permanent magnet end portion located within said first air gap oscillatable between said first pair of pole pieces; means for energizing said electromagnetic means; and a permanent magnet switch member arranged in said second air gap oscillatably between said second pair of pole pieces for connecting said energizing means with said electromagnetic means when attracted by one of said pole pieces and disconnecting said energizing means from said electromagnetic means when attracted by the other of said pole pieces of said second pair of pole pieces.

3. An electric impulse generator comprising in combination, electromagnetic means having first and second pairs of spaced pole pieces forming first and second air gaps respectively, said first air gap being formed at one end of said electromagnetic means, said second air gap being formed at the end opposite said one end of said electromagnetic means; a pendulum having a permanent magnet end portion located within said first air gap oscillatable between said first pair of pole pieces; means for energizing said electromagnetic means; and a permanent magnet switch member arranged in said second air gap oscillatably between said second pair of pole pieces for connecting said energizing means with said electromagnetic means when attracted by one of said pole pieces and disconnecting said energizing means from said electromagnetic means when attracted by the other of said pole pieces of said second pair of pole pieces.

4. An electric impulse generator comprising in combination, electromagnetic means having first and second pairs of spaced pole pieces forming first and second air gaps respectively; a pendulum having a permanent magnet end portion located within said first air gap oscillatable between said first pair of pole pieces; means for energizing said electromagnetic means; a double pole shoe formed with an air gap arranged adjacent to and in line with said second air gap of said electromagnetic means; a permanent magnet having two poles, one of said poles of said permanent magnet being connected to said double pole shoe; and a magnetic switch member connected at one end thereof to the other pole of said permanent magnet, the other end portion of said switch member extending through said air gap formed in said double pole shoe into the region of said second air gap of said electromagnetic means, said switch means having two end positions in each of which said switch means bears simultaneously against one of the pole pieces formed in said second air gap of said electromagnetic means and against one of the poles of said double pole shoe, said switch member connecting in one end position thereof said energizing means with said electromagnetic means and disconnecting said energizing means from said electromagnetic means in the other end position thereof.

5. An electric impulse generator comprising in combination, a self-controlling oscillatable pendulum having a permanent magnet end portion; an oscillatable permanently polarized armature having two end positions of oscillation; coupling means for magnetically coupling said end portion of said pendulum with said armature in one of its end positions so as to urge the same into the other end position thereof, said end portion of said pendulum being urged away from said coupling means in said other end position of said armature; and means cooperating with said armature and said coupling means for urging said armature from said other end position thereof back to said one end position thereof, said end portion of said oscillatable pendulum again urging said armature by means of said magnetic coupling means into said other end position thereof.

6. In an electrical impulse generator, in combination, electromagnet means formed with two air gaps arranged a distance from each other and defining a path for magnetic lines of force; a self-controlling oscillatable pendulum having a permanent magnet portion arranged in one of said air gaps of said electromagnet means; and a polarized oscillatable armature arranged in the other air gap of said electromagnetic means.

7. In an electrical impulse generator, in combination, electromagnet means formed with two air gaps arranged a distance from each other and defining a path for magnetic lines of force; a self-controlling oscillatable pendulum having a permanent magnet portion arranged in one of said air gaps of said electromagnet means; and a fixedly polarized oscillatable armature arranged in the other air gap of said electromagnetic means.

8. In an electrical impulse generator, in combination, electromagnet means formed with two air gaps arranged a distance from each other and defining a path for magnetic lines of force; a self-controlling oscillatable pendulum having a first permanent magnet portion arranged in one of said air gaps; a second permanent magnet; and an oscillatable armature connected at one end thereof to one pole of said second magnet, the other end of said oscillatable armature being arranged in the other air gap of said electromagnet means.

9. In an electrical impulse generator, in combination, electromagnet means having a winding and formed with two air gaps arranged a distance from each other and defining a path for magnetic lines of force; a self-controlling oscillatable pendulum having a permanent magnet end portion arranged in one of said air gaps of said electromagnet means; means for energizing and de-energizing said winding of said electromagnet means; and a polarized oscillatable armature forming part of said means for energizing and de-energizing said winding of said electromagnet means, an end portion thereof being arranged in the other air gap of said electromagnetic means.

10. In an electrical impulse generator, in combination, electromagnet means having a winding and formed with two air gaps arranged a distance from each other and defining a path for magnetic lines of force; a self-controlling oscillatable pendulum having a permanent magnet end portion arranged in one of said air gaps of said electromagnet means; means for energizing and de-energizing said winding of said electromagnet means; a polarized oscillatable armature forming part of said means for energizing and de-energizing said winding of said electromagnet means, an end portion thereof being arranged in the other air gap of said electromagnet means; and means for temporarily holding said armature in said end positions thereof.

References Cited in the file of this patent

UNITED STATES PATENTS

| | | |
|---|---|---|
| 2,337,251 | Knudsen | Dec. 21, 1943 |
| 2,560,124 | Mofenson | July 10, 1951 |
| 2,583,741 | Kiler | Jan. 29, 1952 |
| 2,621,238 | Palmer | Dec. 9, 1952 |